March 21, 1950 P. S. MEFFERD 2,501,231
HYDRAULIC TRACTOR LOADER ATTACHMENT
Filed Feb. 9, 1948 2 Sheets-Sheet 1
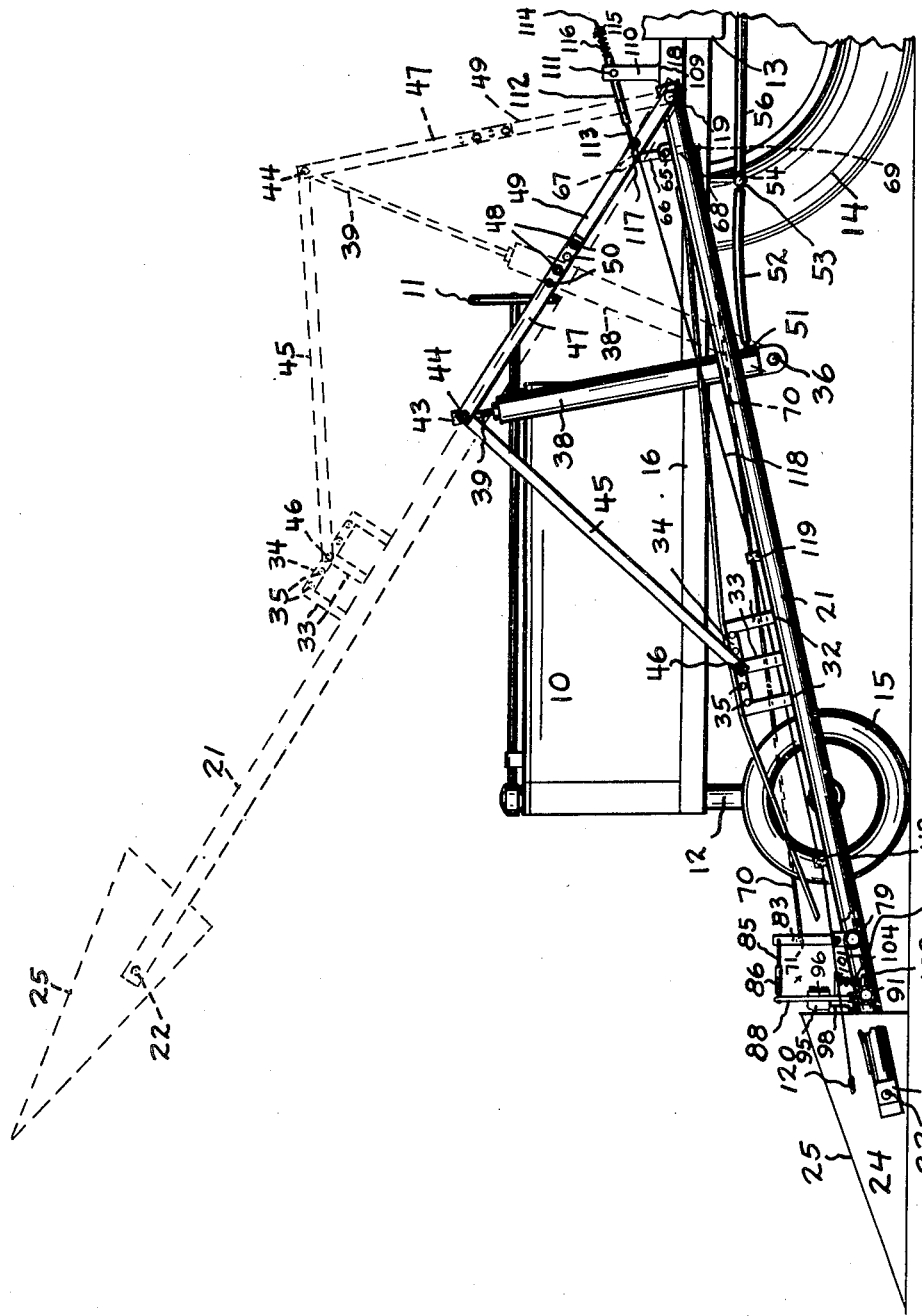
INVENTOR.
Paul S. Mefferd
BY
Sam J. Slotsky
ATTORNEY March 21, 1950  P. S. MEFFERD  2,501,231
HYDRAULIC TRACTOR LOADER ATTACHMENT
Filed Feb. 9, 1948  2 Sheets-Sheet 2
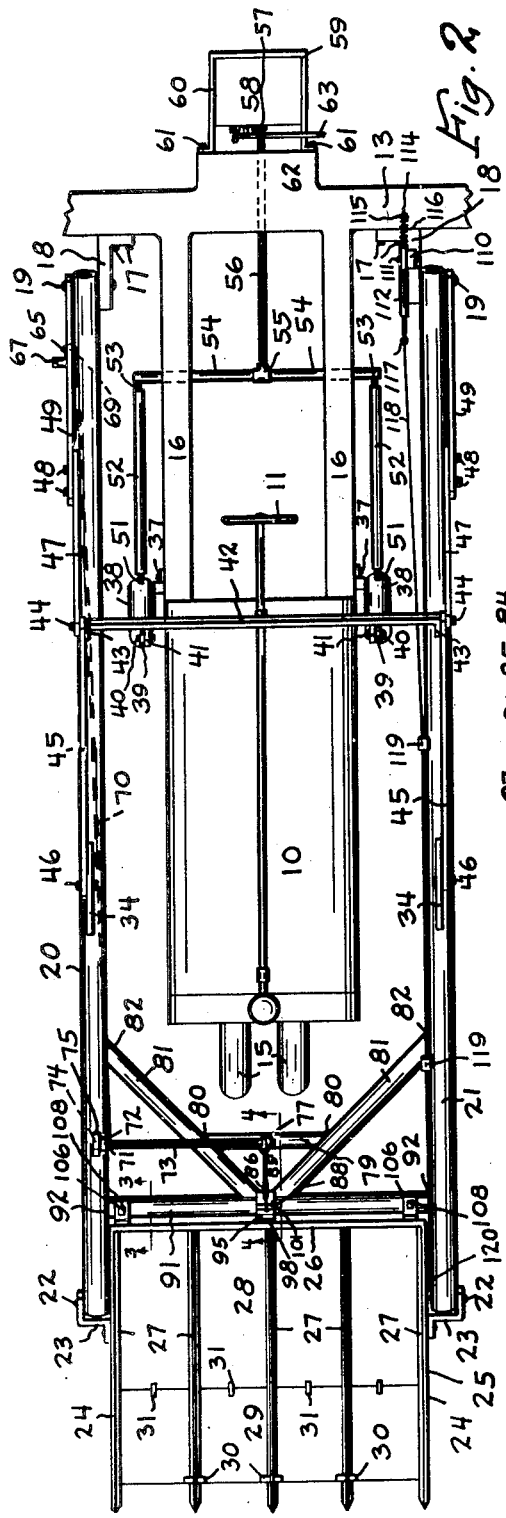
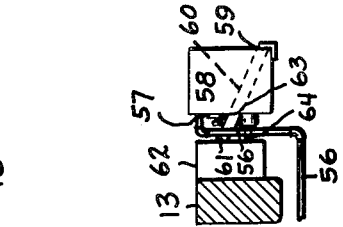
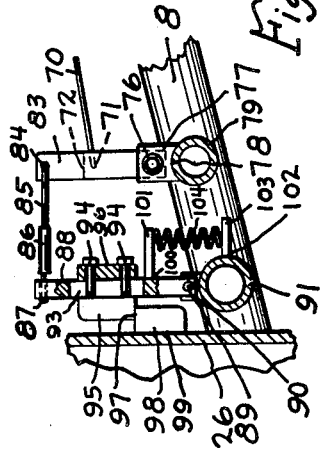
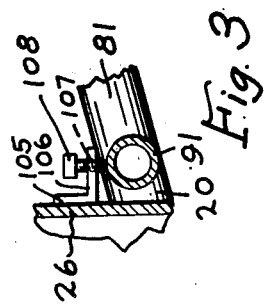
INVENTOR.
Paul S. Mefferd
BY
Sam J. Slotsky
ATTORNEY Patented Mar. 21, 1950

2,501,231

UNITED STATES PATENT OFFICE 2,501,231

HYDRAULIC TRACTOR LOADER ATTACHMENT

Paul S. Mefferd, Laurens, Iowa

Application February 9, 1948, Serial No. 7,058

5 Claims. (Cl. 214—140)

My invention relates to a tractor attachment.

An object of my invention is to provide a tractor loader for elevating manure and other products to a substantial level by the use of hydraulic means.

A further object of my invention is to provide such an arrangement which can be conveniently operated from the tractor seat.

A further object of my invention is to provide means for tipping the bucket used with the arrangement, from the seat.

A further object of my invention is to provide means for changing the angular position of the bucket as desired.

A further object of my invention is to provide an arrangement whereby the bucket will automatically be pivoted to normal position after unloading and upon releasing movement of the loader.

A further and important object of my invention is to provide an arrangement wherein the load carried by the loader is applied rearwardly on the tractor in order to give more traction thereto and to place the load where the tractor is strongest, and also to provide easier steering of the tractor.

A further object of my invention is to provide an elevating arrangement wherein the arms and leverages applied will cause the loader to raise to a maximum elevation.

A further object of my invention is to provide all of the above mentioned objects in a simple construction.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the arrangement as attached to a tractor with a portion thereof being taken in section, Figure 2 is a plan view of Figure 1, Figure 3 is a sectional detail taken along the lines 3—3 of Figure 2, Figure 4 is a sectional detail taken along the lines 4—4 of Figure 2, and Figure 5 is a further side elevation showing the attachment of the hydraulic oil reservoir and pump.

I have used the character 10 to designate a tractor hood, the character 11 the steering wheel, the character 12 the forward spindle, the character 13 the rear axle housing, the character 14 the rear wheels, the character 15 the forward wheels, and the character 16 the bed thereof. Attached to the rear axle housing 13 at 17 are the pair of brackets 18 to which are pivoted at 19 the forwardly extending arms 20 and 21 which are pivoted at 22 to the members 23 which are securely attached to the sides 24 of the bucket member 25, the member 25 including the rear wall 26, the forwardly extending prongs 27 and the bottom stationary portion 28, the bucket further including a detachable bottom portion 29 which is secured by means of clips 30 attached thereto and slidably receiving the prongs 27, so that the portion 29 can be removed as desired. The member 29 also includes further clips 31 adapted to overlie the bottom member 28.

Attached at 32 to the arms 20 and 21 are the vertical members 33 terminating in the cross straps 34 having the several openings 35. Pivotally attached at 36 to the brackets 37 (see Figure 2) which brackets are attached to the frame 16, are a pair of substantially vertical hydraulic cylinders 38 which are slightly tilted from the vertical and which include suitable pistons therein attached to the rods 39, which rods 39 are pivotally attached at 40 to the ears 41 which ears 41 are attached to the transverse bar 42 which extends across the tractor hood 10. Also pivotally attached to the bar 42 and at the bent over ends 43 thereof at 44, are the downwardly extending arms 45 which are pivotally secured at 46 to a pair of openings 35, and also pivoted at the same point 44 are the rearwardly extending straps 47 which are secured by means of the bolts 48 to the further straps 49 which straps 49 are also pivoted at 19. The straps 48 and 49 include a series of openings 50 for allowing variation in the length of the combined straps.

Communicating at 51 to the lower ends of the cylinders 38 are the flexible pipes 52 which are attached at 53 to a further transverse pipe 54 which communicates at 55 with a rearwardly extending pipe 56 which communicates at 57 with an oil pump and reservoir 58 which is secured at 59 to the brackets 60 which are attached at 61 to the rear transmission housing 62 of the tractor. A control lever 63 controls the rate and pressure of oil passing through the pipes 56 and 54, etc., and the oil pump in the casing 58 is driven by means of the tractor rear take-off shaft 64. It will be understood that any type of pressure pump can be employed using the present hydraulic lifting arrangement.

Pivotally attached at 65 to the arm 20 is a foot pedal 66 having the foot engaging upper end 67 and including a lower projecting portion 68 to which is attached at 69 the rod 70, which rod 70 is pivotally attached at 71 to a vertical lever 72 which lever 72 is rigidly attached to a pipe 73, one end of the pipe 73 being journaled at 74 within the upright support 75 which is attached to the arm 20. The pipe 73 is also journaled at 76 within a further upright member 77 (see Fig. 4) which member 77 is attached at 78 to a further transverse pipe 79, which pipe 79 is attached at 80 to the 45° pipe braces 81 which are attached at 82 to the arms 20 and 21. Rigidly secured to the pipe 73 is a further vertical lever 83 to which is attached at 84 the threaded stud 85 which is threadably engaged within a socket 86 which is attached at 87 to a vertical member 88 which member 88 is pivotally attached at 89 to a vertical ear 90 which is attached to the further transverse pipe member 91 which is attached at 92 to the arms 20 and 21. The member 88 includes a vertical slot 93 therein which receives a pair of bolts 94 which bolts are threadably engaged with the block 95, and with the bolt heads bearing against the further block 96. The block 95 normally abuts at 97 against the block 98 which is securely attached at 99 to the rear wall 26 of the bucket.

Attached at 100 to the member 88 is the rearwardly projecting arm 101, and attached at 102 to the pipe member 91 is a further rearwardly projecting ledge 103. Attached to, and positioned between the arm 101 and the ledge 103 is a compression spring 104. Attached at 105 to the rear wall 26 are a pair of angle members 106 which threadably receive at 107 the short bolts 108 which bear against the transverse pipe member 91.

Attached at 109 to one of the brackets 18 is a vertical post 110 to which is pivotally attached at 111 the cylindrical tube 112 through which passes a rod 113 which terminates in the threaded extremity 114 including the assembled washer and nut 115 thereon. Positioned between the member 115 and the inner end of the tube 112 is a compression spring 116. Attached at 117 to the other end of the rod 113 is a cable 118 which passes beneath the guides 119 which are attached to the arm 21, and the cable 118 is attached at 120 to one of the sides 24 of the bucket member 25.

The arrangement is operated in the following manner: The tractor is driven forwardly to scoop the material in the usual manner, and for raising the bucket, the lever 63 is operated to cause oil under pressure to travel through the pipes 56, 54, and 52 into the cylinders 38. This causes the rods 39 to rise, thereby elevating the bucket to any desired height as controlled by the operator in manipulating the lever 63. For adjusting the range of elevation of the arrangement, the straps 45, 47, and 49 can be attached to any of the various openings 35 and 50, thereby changing the distance between the lower end of the straps and the upper end of the rod 39 to correspondingly increase or decrease the range, this arrangement also permitting means whereby the load can be better distributed, as well as allowing positioning of the cylinders 38 at slightly different angles if desired. This arrangement also permits any other variations as required. It will be noted that the positioning of the cylinders toward the rear of the tractor insures that the load is carried by the more substantial portions of the tractor effecting the advantages described above. It will also be noted that by virtue of this arrangement the lever arms ahead of the pivoting points of the rods 39 are much greater than those behind the same thereby allowing a substantial lifting range to the arrangement, as is shown by the dotted structure in Figure 1.

After the bucket is raised, it is tipped by pushing on the foot lever 67 forwardly, which carries the portion 68 rearwardly, which in turn pulls the rod 70 and pivots the lever 72 rearwardly thereby also pivoting the lever 83 in the same direction and pulling the block 95 away from the block 98 so that the bucket will fall by gravity.

It will be noted that when the arms 20 and 21 raise, since the pivoting point 111 of the member 112 is above the pivoting points 19 the cable 118 will slacken since it will get shorter during the raising operation. The bucket can then tip as above explained. However, as the arms 20 and 21 drop again, the cable 118 will gradually tighten and carry the bucket back to a horizontal position at the lowest portion of the dropping action whereby the block 98 will travel past the block 95 and lock, and the bucket will be in normal scooping position again. The spring 116 takes up the tension or slack at all times during this operation to allow for any variation, and it will be thus seen that this arrangement automatically brings the bucket back to normal position without attention from the operator. The spring 104 maintains the necessary spring action in the tripping arrangement.

The bucket can be originally tilted to any desired angle by sliding the blocks 95 and 96 upwardly or downwardly by means of loosening the bolts 94 and thence retightening. This will change the angle of inclination of the bucket as desired, the further bolts 108 being turned in either direction to compensate for the change, and to provide a solid structure. The lever 63 allows control in either the raising or lowering operation, and also allows control of the rate in which the arms are raised or lowered.

It will now be seen that I have provided all of the advantages mentioned in the objects of my invention, with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A hydraulic tractor loader attachment comprising a pair of hydraulic cylinders pivotally secured toward the rear of a tractor frame, an oil pressure pump, means for forcing oil from said pump into said cylinders, a pair of supporting arms pivotally secured to the tractor framework, said cylinders being positioned substantially vertically, pistons received in said cylinders including rods attached thereto, means for supporting said supporting arms from said piston rods, said means including divergent pairs of arms pivotally secured to the rear of said supporting arms, and to forward portions thereof, means for varying the lengths of said divergent arms, said means including brackets attached to said supporting arms having a plurality of openings, the forwardly divergent arms attached to any selected pairs of such openings, the rearwardly divergent arms having joined sections having a plurality of openings for adjusting the completed lengths thereof, a bucket member pivotally attached to the forward ends of said supporting arms, means for tipping said bucket member controlled from the rear of the arms, including a block secured to the bucket, a spring urged lever, a further block attached to said spring urged lever engaging said block, means for drawing said lever rearwardly to disengage said blocks, further levers attached to said lever, a foot pedal attached to one of the said supporting arms for actuating all of said levers.

2. A hydraulic tractor loader attachment comprising a pair of hydraulic cylinders pivotally secured toward the rear of a tractor frame, an oil pressure pump, means for forcing oil from said pump into said cylinders, a pair of supporting arms pivotally secured to the tractor framework, said cylinders being positioned substantially vertically, pistons received in said cylinders including rods attached thereto, means for supporting said supporting arms from said piston rods, said means including divergent pairs of arms pivotally secured to the rear of said supporting arms, and to forward portions thereof, means for varying the lengths of said divergent arms, said means including brackets attached to said supporting arms having a plurality of openings, the forwardly divergent arms attached to any selected pairs of such openings, the rearwardly divergent arms having joined sections having a plurality of openings for adjusting the completed lengths thereof, a bucket member pivotally attached to the forward ends of said supporting arms, means for tipping said bucket member controlled from the rear of the arms, including a block secured to the bucket, a spring urged lever, a further block attached to said spring urged lever engaging said block, means for drawing said lever rearwardly to disengage said blocks, further levers attached to said lever, a foot pedal attached to one of the said supporting arms for actuating all of said levers, means for adjusting the block attached to said lever to provide a desired pitch to said bucket member.

3. A hydraulic tractor loader attachment comprising a pair of hydraulic cylinders pivotally secured toward the rear of a tractor frame, an oil pressure pump, means for forcing oil from said pump into said cylinders, a pair of supporting arms pivotally secured to the tractor framework, said cylinders being positioned substantially vertically, pistons received in said cylinders including rods attached thereto, means for supporting said supporting arms from said piston rods, said means including divergent pairs of arms pivotally secured to the rear of said supporting arms, and to forward portions thereof, means for varying the lengths of said divergent arms, said means including brackets attached to said supporting arms having a plurality of openings, the forwardly divergent arms attached to any selected pairs of such openings, the rearwardly divergent arms having joined sections having a plurality of openings for adjusting the completed lengths thereof, a bucket member pivotally attached to the forward ends of said supporting arms, means for tipping said bucket member controlled from the rear of the arms, including a block secured to the bucket, a spring urged lever, a further block attached to said spring urged lever engaging said block, means for drawing said lever rearwardly to disengage said blocks, further levers attached to said lever, a foot pedal attached to one of the said supporting arms for actuating all of said levers, means for adjusting the block attached to said lever to provide a desired pitch to said bucket member, means for automatically re-setting said bucket member to normal horizontal position upon lowering thereof.

4. A hydraulic tractor loader attachment comprising a pair of hydraulic cylinders pivotally secured toward the rear of a tractor frame, an oil pressure pump, means for forcing oil from said pump into said cylinders, a pair of supporting arms pivotally secured to the tractor framework, said cylinders being positioned substantially vertically, pistons received in said cylinders including rods attached thereto, means for supporting said supporting arms from said piston rods, said means including divergent pairs of arms pivotally secured to the rear of said supporting arms, and to forward portions thereof, means for varying the lengths of said divergent arms, said means including brackets attached to said supporting arms having a plurality of openings, the forwardly divergent arms attached to any selected pairs of such openings, the rearwardly divergent arms having joined sections having a plurality of openings for adjusting the completed lengths thereof, a bucket member pivotally atached to the forward ends of said supporting arms, means for tipping said bucket member controlled from the rear of the arms, including a block secured to the bucket, a spring urged lever, a further block attached to said spring urged lever engaging said block, means for drawing said lever rearwardly to disengage said blocks, further levers attached to said lever, a foot pedal attached to one of the said supporting arms for actuating all of said levers, means for adjusting the block attached to said lever to provide a desired pitch to said bucket member, means for automatically re-setting said bucket member to normal horizontal position upon lowering thereof, including a bracket attached rearwardly on said tractor, a spring urged rod pivotally secured to said bracket, the pivoting point of said rod being above the rear pivoting point of said supporting arms, a cable attached to said rod, the forward end of said cable being attached to said bucket member at a point above the pivoting point of said bucket member and said supporting arms, to thereby provide means for slackening of said cable when the arms are raised, and to re-set said bucket member when the arms are lowered.

5. A hydraulic tractor loader attachment comprising a pair of hydraulic cylinders pivotally secured toward the rear of a tractor frame, an oil pressure pump, means for forcing oil from said pump into said cylinders, a pair of supporting arms pivotally secured to the tractor framework, said cylinders being positioned substantially vertically, pistons received in said cylinders including rods attached thereto, means for supporting said supporting arms from said piston rods, a bucket member pivotally attached to the forward ends of said supporting arms, means for automatically re-setting said bucket member to normal horizontal positioning upon lowering thereof, including a bracket attached rearwardly on said tractor, a spring urged rod pivotally secured to said bracket, the pivoting point of said rod being above the rear pivoting point of said supporting arms, a cable attached to said rod, the forward end of said cable being attached to said bucket member at a point above the pivoting point of said bucket member and said supporting arms, to thereby provide means for slackening of said cable when the arms are raised, and to re-set said bucket member when the arms are lowered.

PAUL S. MEFFERD.

REFERENCES CITED

The following references are of record in the file of this patent:

UNITED STATES PATENTS

| Number | Name | Date |
|---|---|---|
| 2,242,860 | Huelle | May 20, 1941 |
| 2,319,921 | Dooley et al. | May 25, 1943 |
| 2,389,029 | Crabtree | Nov. 13, 1945 |
| 2,391,224 | Carter | Dec. 18, 1945 |
| 2,393,435 | Wachter | Jan. 22, 1946 |
| 2,397,303 | Vowless | Mar. 26, 1946 |
| 2,451,101 | Leschinsky | Oct. 12, 1948 |